(12) United States Patent
Anderson et al.

(10) Patent No.: US 6,984,278 B2
(45) Date of Patent: Jan. 10, 2006

(54) METHOD FOR TEXTURING A FILM

(75) Inventors: Brent Anderson, Barrington, IL (US); Howard W. Schwan, Crystal Lake, IL (US)

(73) Assignee: CTI Industries, Corporation, Barrington, IL (US)

( * ) Notice: Subject to any disclaimer, the term of this patent is extended or adjusted under 35 U.S.C. 154(b) by 280 days.

(21) Appl. No.: 10/042,955

(22) Filed: Jan. 8, 2002

(65) Prior Publication Data

US 2003/0127178 A1    Jul. 10, 2003

(51) Int. Cl.
*B32B 31/06* (2006.01)
*B32B 31/22* (2006.01)
*B32B 31/30* (2006.01)

(52) U.S. Cl. .................. 156/209; 156/219; 156/244.22; 156/244.27

(58) Field of Classification Search ................ 156/209, 156/219, 220, 244.11, 244.16, 244.22, 582, 156/547, 549, 550, 553, 244.27; 428/141, 428/187; 220/666, 667, 669, 670, 674, 607, 220/608; 222/547, 564
See application file for complete search history.

(56) References Cited

U.S. PATENT DOCUMENTS

| | | | |
|---|---|---|---|
| 336,826 A | 2/1886 | Steeneken | |
| 972,095 A | 10/1910 | Booth | |
| 1,109,110 A | 9/1914 | Clark | |
| 1,884,215 A | 2/1932 | Edwards | |
| 2,024,908 A | 12/1935 | Blum | |
| 2,027,290 A | 1/1936 | Reach | |
| 2,106,671 A | 1/1938 | Watson | |
| 2,116,009 A | 5/1938 | Brown | |
| 2,133,411 A | 10/1938 | Zohe | |
| 2,196,708 A | 4/1940 | Reid | |
| 2,392,594 A * | 1/1946 | Karfiol et al. | ............... 428/161 |
| 2,477,300 A | 7/1949 | Karfiol et al. | |
| 2,569,975 A | 10/1951 | Cone | |
| 2,643,027 A | 6/1953 | Fink | |
| 2,659,516 A | 11/1953 | Smith | |
| 2,672,268 A | 3/1954 | Bower | |
| 2,697,635 A | 12/1954 | Ivins et al. | |
| 2,714,557 A | 8/1955 | Mahaffy | |
| 2,731,297 A | 1/1956 | Meyer | |
| 2,736,468 A | 2/1956 | Hills | |
| 2,778,171 A | 1/1957 | Taunton | |

(Continued)

FOREIGN PATENT DOCUMENTS

EP    1153974 A1 *  11/2001

(Continued)

OTHER PUBLICATIONS

Brubaker et al. "The Coil Test and Neutrophil Stimulation Pack" (1977).

*Primary Examiner*—Gladys JP Corcoran
(74) *Attorney, Agent, or Firm*—Everest Intellectual Property Law Group; Joseph A. Fuchs

(57) ABSTRACT

The present invention provides a method for treating a surface of a layered polymeric structure. The method includes the steps of: (1) providing a first sheet of material, (2) providing a second sheet of material, (3) positioning the first sheet or the second sheet to overlap at least a portion of the other sheet to define an interference zone, (4) directing a first polymeric material into the interference zone to adhere the first sheet to the second sheet to form the layered structure; and (5) texturing a surface of the first sheet or the second sheet to form a pattern on the surface.

59 Claims, 3 Drawing Sheets

U.S. PATENT DOCUMENTS

| | | | |
|---|---|---|---|
| 2,778,173 A | 1/1957 | Taunton |
| 2,804,257 A | 8/1957 | Hasler et al. |
| 2,809,800 A | 10/1957 | Ahl |
| 2,859,899 A | 11/1958 | Kramer et al. |
| 2,862,648 A | 12/1958 | Cooksley et al. |
| 2,870,954 A | 1/1959 | Kulesza |
| 2,885,084 A | 5/1959 | Rocca |
| 2,891,700 A | 6/1959 | Maynard |
| 2,920,798 A | 1/1960 | Samuel |
| 3,063,461 A | 11/1962 | Rudolph |
| 3,081,911 A | 3/1963 | Scholle |
| 3,083,875 A | 4/1963 | Welty et al. |
| 3,090,526 A | 5/1963 | Hamilton et al. |
| 3,110,754 A | 11/1963 | Witort et al. |
| 3,112,047 A | 11/1963 | Weinreich et al. |
| 3,142,599 A | 7/1964 | Chavannes |
| 3,171,571 A | 3/1965 | Daniels |
| 3,176,727 A | 4/1965 | Rousseau |
| 3,197,073 A | 7/1965 | Gondra et al. |
| 3,203,026 A | 8/1965 | Schwartzman |
| 3,204,825 A | 9/1965 | Underwood |
| 3,212,681 A | 10/1965 | Weikert |
| 3,219,240 A | 11/1965 | Campbell, Jr. |
| 3,240,399 A | 3/1966 | Frandeen |
| 3,244,576 A | 4/1966 | Swartz |
| 3,254,828 A | 6/1966 | Lerner |
| 3,257,036 A | 6/1966 | Micallef |
| 3,260,412 A | 7/1966 | Larkin |
| 3,334,659 A | 8/1967 | Magorien |
| 3,342,377 A | 9/1967 | Peredy |
| 3,361,303 A | 1/1968 | Jacuzzi |
| 3,366,284 A | 1/1968 | Marona |
| 3,367,380 A | 2/1968 | Dickey |
| 3,411,698 A | 11/1968 | Reynolds |
| 3,420,413 A | 1/1969 | Corsette |
| 3,456,850 A | 7/1969 | Uhlmann |
| 3,469,796 A | 9/1969 | Guenther |
| 3,549,050 A | 12/1970 | Bruce et al. |
| 3,587,794 A | 6/1971 | Mattel |
| 3,666,182 A | 5/1972 | Cureton |
| 3,695,314 A | 10/1972 | Watts et al. |
| 3,718,236 A | 2/1973 | Reyner et al. |
| 3,799,914 A | 3/1974 | Schmit |
| 3,809,217 A | 5/1974 | Harrison |
| 3,838,794 A | 10/1974 | Cogley et al. |
| 3,881,519 A | 5/1975 | Zahid |
| 3,902,516 A | 9/1975 | Rudolph |
| 3,946,780 A | 3/1976 | Sellers |
| 3,958,693 A | 5/1976 | Greene |
| 3,981,415 A | 9/1976 | Fowler et al. |
| 3,988,499 A | 10/1976 | Reynolds |
| 4,014,461 A | 3/1977 | Harvill |
| 4,015,819 A | 4/1977 | Zahid |
| 4,041,209 A | 8/1977 | Scholle |
| 4,062,475 A | 12/1977 | Harris et al. |
| 4,087,026 A | 5/1978 | Petterson |
| 4,093,068 A | 6/1978 | Smrt |
| 4,137,930 A | 2/1979 | Scholle |
| 4,138,036 A | 2/1979 | Bond |
| 4,148,416 A | 4/1979 | Gunn-Smith |
| 4,150,696 A | 4/1979 | Meier et al. |
| 4,152,184 A | 5/1979 | Bacehowski |
| 4,159,790 A | 7/1979 | Bailey |
| 4,193,518 A | 3/1980 | Holmes |
| 4,214,675 A | 7/1980 | Schmit |
| 4,224,367 A | 9/1980 | Scholle |
| 4,257,535 A | 3/1981 | Mellett |
| 4,258,863 A | 3/1981 | Ness |
| 4,265,373 A | 5/1981 | Stoody |
| 4,266,692 A | 5/1981 | Clark |
| 4,269,884 A | 5/1981 | Della Vecchia et al. |
| 4,270,533 A | 6/1981 | Andreas |
| 4,275,823 A | 6/1981 | Credle, Jr. |
| 4,284,671 A | 8/1981 | Cancio et al. |
| 4,286,636 A | 9/1981 | Credle |
| 4,322,020 A | 3/1982 | Stone |
| 4,326,574 A | 4/1982 | Palaroni et al. |
| 4,362,255 A | 12/1982 | Bond |
| 4,375,864 A | 3/1983 | Savage |
| 4,381,846 A | 5/1983 | Heck |
| 4,445,539 A | 5/1984 | Credle |
| 4,445,550 A | 5/1984 | Davis et al. |
| 4,449,243 A | 5/1984 | Platel |
| 4,484,697 A | 11/1984 | Fry, Jr. |
| 4,513,884 A | 4/1985 | Magid |
| 4,524,458 A | 6/1985 | Pongrass et al. |
| 4,551,379 A | 11/1985 | Kerr |
| 4,576,283 A | 3/1986 | Fafournoux |
| 4,579,756 A | 4/1986 | Edgel |
| 4,600,130 A | 7/1986 | Libit |
| 4,601,410 A | 7/1986 | Bond |
| 4,683,702 A | 8/1987 | Vis |
| 4,815,631 A | 3/1989 | Eeg et al. |
| 4,893,731 A | 1/1990 | Richter |
| 5,006,056 A * | 4/1991 | Mainstone et al. ......... 425/186 |
| 5,024,354 A | 6/1991 | Ledewiz |
| 5,147,071 A | 9/1992 | Rutter |
| 5,232,535 A | 8/1993 | Brinley |
| 5,385,564 A | 1/1995 | Slater |
| RE34,929 E | 5/1995 | Kristen |
| 5,647,511 A | 7/1997 | Bond |
| 5,728,086 A | 3/1998 | Niedospial, Jr. |
| 5,743,435 A | 4/1998 | Tomic |
| 5,749,493 A | 5/1998 | Boone et al. |
| 5,915,596 A | 6/1999 | Credle, Jr. |
| 5,928,762 A | 7/1999 | Aizawa et al. |
| 5,941,421 A | 8/1999 | Overman et al. |
| 6,012,611 A | 1/2000 | Schroeder |
| 6,045,006 A | 4/2000 | Frazier et al. |
| 6,073,807 A | 6/2000 | Wilford et al. |
| 6,102,252 A | 8/2000 | Overman et al. |
| 6,179,173 B1 | 1/2001 | Frazier et al. |
| 6,223,981 B1 | 5/2001 | Gunder |
| 6,500,559 B2 * | 12/2002 | Hofmeister et al. ...... 428/474.4 |
| 6,533,884 B1 * | 3/2003 | Mallik ....................... 156/209 |
| 6,715,644 B2 * | 4/2004 | Wilford ....................... 222/95 |
| 2003/0089737 A1 | 5/2003 | Wilford |
| 2003/0136798 A1 | 7/2003 | Wilford |
| 2004/0065402 A1 * | 4/2004 | Knoerzer et al. ........... 156/209 |

FOREIGN PATENT DOCUMENTS

| | | |
|---|---|---|
| GB | 732761 | 6/1955 |
| GB | 756093 | 8/1956 |
| GB | 1 473 524 | 5/1977 |
| WO | 83/01605 | 5/1983 |
| WO | 85/04383 | 10/1985 |
| WO | WO 200018836 A1 * | 4/2000 |
| WO | 01/36276 A2 | 5/2001 |

* cited by examiner

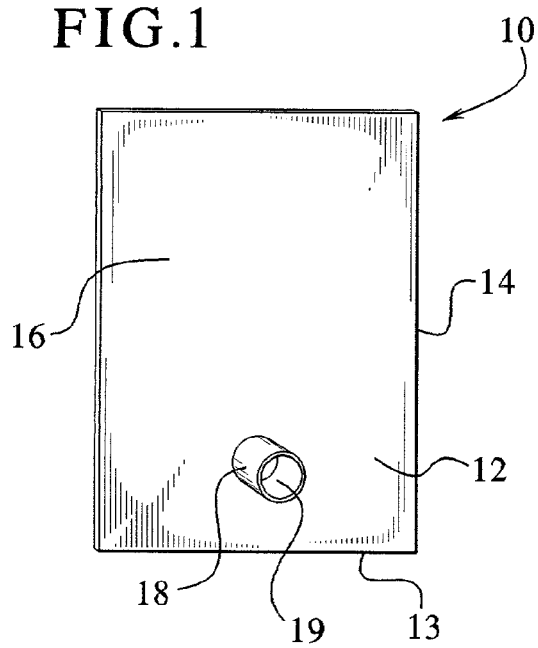
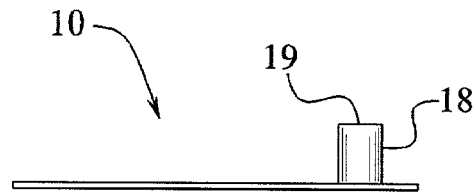
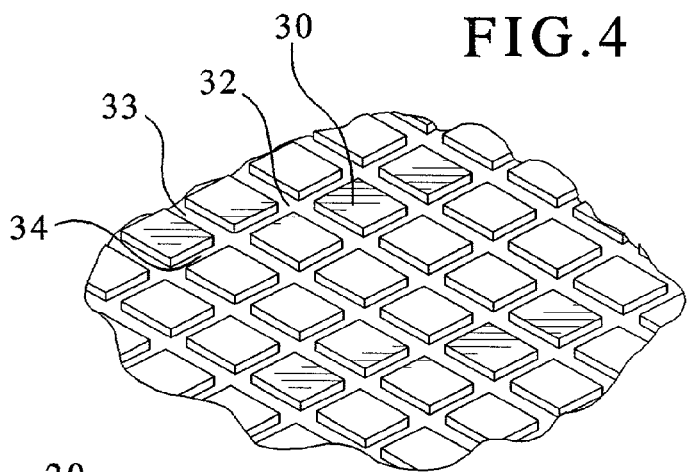
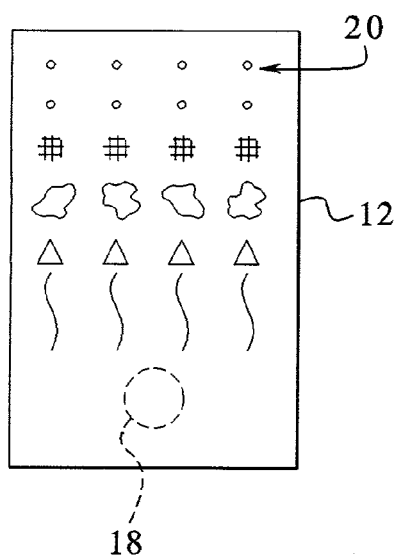
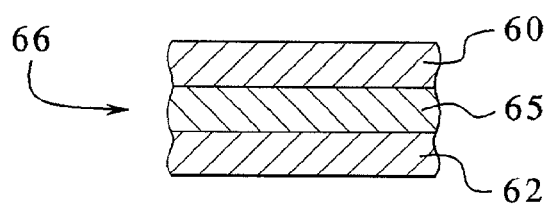

METHOD FOR TEXTURING A FILM

TECHNICAL FIELD

The present invention relates generally to a method for texturing a film and more particularly for texturing a film to be fabricated into a fluid container.

BACKGROUND OF THE INVENTION

Collapsible plastic bags are often used to store liquid products such as chemicals, soft drink syrup, fruit juices and food condiments. The plastic bags are typically housed in a corrugated paperboard box to aid in the transporting, handling and dispensing of the product. Such packaging systems are commonly referred to as "bag-in-box" packaging systems.

The plastic bags typically have sidewalls sealed along a peripheral seam to define a fluid containing chamber. A spout or a fitment provides access to the fluid chamber for filling and dispensing the product within the bag. Vacuum pump systems are sometimes connected to the container to assist in draining fluid from the container. Both gravity dispensing bags and vacuum pump systems suffer from the common drawback that fluid may become trapped within the folds of the bag during draining. Because of this, evacuation channels are often placed within the bag. Evacuation channels are typically elongate cylindrical tubes or flat strips with protruding ribs defining grooves. Typically, one end of the evacuation channel is disposed transverse to, or is connected to the spout, and the other end of the evacuation channel extends into the fluid containing chamber of the bag. As the bag is emptied by the force of the vacuum pump, or by the force of gravity, portions of the bag collapse unevenly, tending to leave pockets of product, typically liquid, which may become isolated from the rest of the liquid in the container. The evacuation channel, however, forms a conduit which cannot be closed off by the folds created in the bag. In this manner the entire chamber of the flexible bag remains in communication with the spout at all times during the dispensing such that all product within the bag can be removed.

Prior attempts to provide such bags are disclosed in U.S. Pat. Nos. 4,601,410; 5,647,511 and 5,749,493. U.S. Pat. Nos. 4,601,410 and 5,647,511 disclose a liquid container with an evacuation unit. In both the '410 and '511 patents, the evacuation unit is shown attached directly to the spout by a mounting ring. Several problems have been encountered with these types of evacuation units. For example, during the filling process, which is typically done in a high speed and high pressure process, the evacuation unit is susceptible of being dislodged from the spout thereby rendering the evacuation unit inoperative. Also, the attaching ring can impede the flow of liquid during the filling process thereby slowing the filling process.

U.S. Pat. No. 5,749,493 discloses an evacuation unit positioned within a bag and transverse and perpendicular to a spout in the bag. Because the evacuation unit is positioned in a location that is in line with the incoming fluid during the filling process, it is susceptible of being dislodged from its mounting to the container thereby rendering it ineffective. The '493 Patent also discloses extruding a pair of ribs or a single rib or protuberance extending the length of the container.

Many of the designs which utilize an evacuation unit positioned within the bag require that the unit be placed into the bag after the bag has been substantially constructed. This is undesirable because it adds another step to the manufacturing process and increases the labor costs.

U.S. Pat. No. Re. 34,929 discloses a plastic bag having interconnected air channels on its inner surface for the vacuum packaging of perishable items. The air channels are formed by the spaces between a plurality of raised protuberances having uniform thickness and formed in a generally regular and waffle-like pattern. The protuberances prevent the total collapse of the bag during air evacuation. There is no disclosure to utilize a fitment to provide access to the contents of the container. There is also no disclosure of removing the stored contents of the bag, but, rather only discloses moving air from the package to prevent spoilage of the perishable item contained therein.

U.S. Pat. No. 2,778,171 discloses the production of airtight packages for packaging perishable items such as food. Projections are provided near an opening of the airtight package for keeping sidewalls of the container from fully collapsing against one another while air is being evacuated from the container. There is no disclosure of evacuating a stored product from the container and no disclosure of providing a fitment with the bag to provide access to the stored contents.

U.S. Pat. No. 5,728,086 discloses a flexible container having multiple access ports and particularly discloses a container for storing fluids for parenteral administration to a patient. An inner surface of a sidewall of the container can have various patterns embossed thereon to assist in draining the contents of the container.

U.S. Pat. No. 5,928,762 discloses a laminate of a base film and an embossed sheet and a method for fabricating the same. The method includes the steps of joining a base sheet to a molten sheet material. The molten sheet material is cooled and solidified using a cooling roll having embossing patterns in its surface. The method includes the steps of embossing the molten sheet and simultaneously laminating the molten sheet with the base sheet. In an alternative method, an adhesive resin is coextruded on the side of the molten sheet facing the base material. There is no disclosure in the '762 Patent of utilizing more than a single preformed sheet material to fabricate a layered polymeric structure.

SUMMARY OF THE INVENTION

The present invention provides a method for treating a surface of a layered polymeric structure. The method includes the steps of: (1) providing a first sheet of material, (2) providing a second sheet of material, (3) positioning the first sheet or the second sheet to overlap at least a portion of the other sheet to define an interference zone, (4) directing a first polymeric material into the interference zone to adhere the first sheet to the second sheet to form the layered structure; and (5) texturing a surface of the first sheet or the second sheet to form a pattern on the surface.

BRIEF DESCRIPTION OF THE DRAWINGS

FIG. 1 is a perspective view of a container having a fitment;

FIG. 2 is a side view of the container of FIG. 1;

FIG. 3 is a sidewall of the container of FIG. 1 having objects having varying shapes;

FIG. 4 is a sidewall of the container of FIG. 1 having a plurality of regularly spaced rectangular protuberances to define a checkerboard pattern;

FIG. 7 is a cross-sectional view of a multiple layered film having a textured surface.

DETAILED DESCRIPTION

Figure 5:
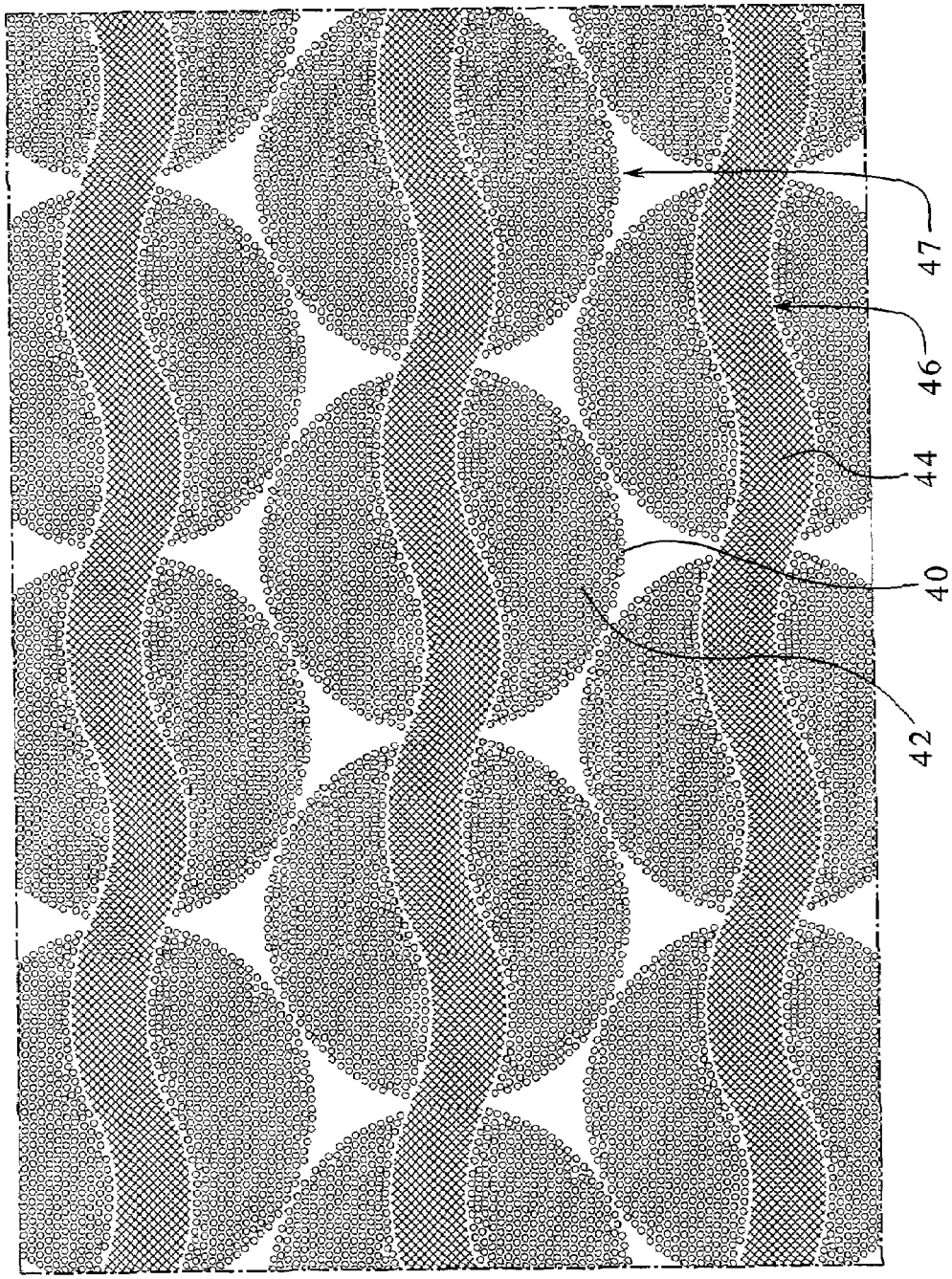
FIG. 5 is a sidewall having circular protuberances together forming a circular pattern with a series of X-shaped protuberances forming S-shaped lines.

While this invention is susceptible of embodiment in many different forms, herein will be described in detail with the accompanying figures, a preferred embodiment of the invention. The present disclosure is to be considered as an exemplification of the principles of the invention and is not intended to limit the broad aspect of the invention to the embodiments illustrated and described.

FIGS. 1 and 2 show a flexible container assembly 10 having a first sidewall 12 and a second sidewall 13 attached at peripheral edges 14 to define a fluid tight chamber 16. A spout 18 is attached to the sidewall 12 and provides fluid flow access to the chamber 16. In a preferred form of the invention, the first and second sidewalls 12 and 13 are a flexible polymeric material having a modulus of elasticity of less than 50,000 psi. In a preferred form of the invention the sidewalls have sufficient flexibility to collapse upon draining.

The sidewalls can be formed from a monolayer film, a multiple layer film or can be formed of several individual sheets of such films joined together to define a multiple sheet sidewall.

Suitable polymeric materials for forming these films include polyolefins, ethylene and vinyl acetate copolymers, ethylene copolymerized with carboxylic acids having from 3 to 20 carbons and ester and anhydride derivatives thereof, ethylene and vinyl alcohol copolymers, polyamides, polyesters, polyvinyl vinyl chloride, PVDC and the like. The film can be formed by polymer processing techniques well known in the art including, but not limited to, extrusion, coextrusion, molding, blow molding, blown extrusion, lamination and the like. The films can also be treated by primers, ozonolysis, and can be metalized.

Suitable polyolefins include homopolymers such as polyethylene, polypropylene, polybutene, etc., and copolymers of ethylene and α-olefins where the α-olefins have from 3–20 carbons, and more preferably from 4 to 8 carbons. Suitable polyethylene homopolymers include those commonly referred to as low density polyethylene (LDPE). Suitable ethylene and α-olefin copolymers include, for example, ethylene butene copolymers, ethylene hexene copolymers and ethylene and octene copolymers. These copolymers are commonly referred to as linear low density polyethylene (LLDPE), very low density polyethylene (VLDPE) and ultra-low density polyethylene (ULDPE) and typically have a density of less than about 0.915 g/cc.

Suitable polyamides include polyamides formed from condensation reactions of diamines and dicarboxylic acids or ring opening reactions of caprolactams. In a preferred form of the invention the polyamides are selected from the group nylon 6,6, nylon 6, and nylon 6,12 and even more preferably is nylon 6.

The container 10 can be made from individual sheets of film placed in registration and sealed along the periphery 14 using standard sealing techniques well known in the art.

FIG. 2 shows the fitment 18 has an opening 19 having an axis essentially perpendicular to the sidewall 12 of the container. It is contemplated the fitment 18 can be mounted at various angles to the sidewall without departing from the present invention. The fitment 18 provides fluid access to the contents of the chamber 16. Typically, container 10 is used for housing liquids such as soft drink syrup which are withdrawn from the container under pressure with a hose and mixed at a fountain with a diluent such as soda water. The hose (not shown) has an attachment for connecting to the fitment in a fluid and air tight arrangement. A vacuum pressure is applied to the fitment 18 through the hose to withdraw fluid under pressure from the container. Of course, the fitment 18 may be attached to the first or second sidewall 12, 13 or both and may be located at any location thereon.

FIG. 3 shows a plurality of objects 20 on the sidewall 12. In a preferred form of the invention the objects 20 are positioned on a fluid contacting surface of the sidewall. The objects 20 can be positioned on a single sidewall or both. The objects, in a preferred form of the invention, are provided over substantially an entire surface of the sidewall but could also be provided only in select areas of the sidewall without departing from the scope of the invention. The objects can be of any shape including regular shapes such as circular, polygonal, straight or curved lines, symbols or the like. The objects can also be irregular or amorphous in form. These objects 20 when positioned in a fluid contacting portion of the sidewall assist in draining fluid from the chamber 16. The objects 20 can be raised protuberances or indentations in these shapes. The objects 20 can be all of the same shape or can be of any combination of varying shaped objects. In one form of the invention, the objects 20 can be positioned to extend in a line extending longitudinally, lattitudinally, diagonally of the sidewall or a combination of the same. The objects 20 can be of varying sizes provided the objects are effective to provide fluid pathways through the container when the fluid or particulate contents of the container is being evacuated.

The objects 20 can form a regular pattern or an irregular pattern. The regular pattern includes objects being placed at the same or essentially the same spacing or a repeating sequence of spacings. The irregular pattern is one where the objects are generally randomly distributed.

In a preferred form of the invention as shown in FIG. 4, a regularly spaced pattern of rectangular-shaped objects 30 having pathways 32 defined therebetween. This checkerboard pattern has at least a first pathway 33 intersecting a second pathway 34. In a preferred form of the invention the intersection of the pathways are substantially perpendicular to one another. However, it is contemplated the intersection of pathways 32 can form various angles without departing from the present invention.

FIG. 5 shows another preferred form of the invention having a plurality of circular protuberances 40 grouped together with X-shaped protuberances 44 on a sidewall. The circular protuberances 40 are grouped to define a circular shape 42 pattern. The X-shaped protuberances 44 are grouped to define a S-shaped pattern 46. The x-shaped pattern is positioned within the circular shaped 42 pattern to define a sum object 47. The sum object 47 is shown to be a company logo 47 but could also be other indicia such as a trademark, a tradename, instructions for use of the film or object made from the film or other identifying or useful information or advertising that can be viewed through one of the sidewalls 12 or 13 or both.

A plurality of sum objects 47 are shown connected together to define a web of interconnected sum objects 47. It is contemplated that the sum objects 47 could be positioned in other relationships and other patterns without departing from the scope of the invention. Of course it is also contemplated that any combination of shapes of protuberances can be used and that more than two different shapes can be used together to form patterns of various shapes and sizes.

The present invention further provides a process for evacuating the container shown in FIG. 1. The method for evacuating a fluid from a container comprises the steps of: (1) providing a liquid filled container having a sidewall having an inner surface; (2) providing a plurality of objects on the inner surface of the sidewall to define a plurality of channels having at least a first channel and a second channel intersecting one another; (3) providing a fitment attached to the sidewall, the fitment having an opening therethrough having an axis substantially perpendicular to the outer surface; and (4) applying a suction to the fitment to draw fluid from the container.

Figure 6:
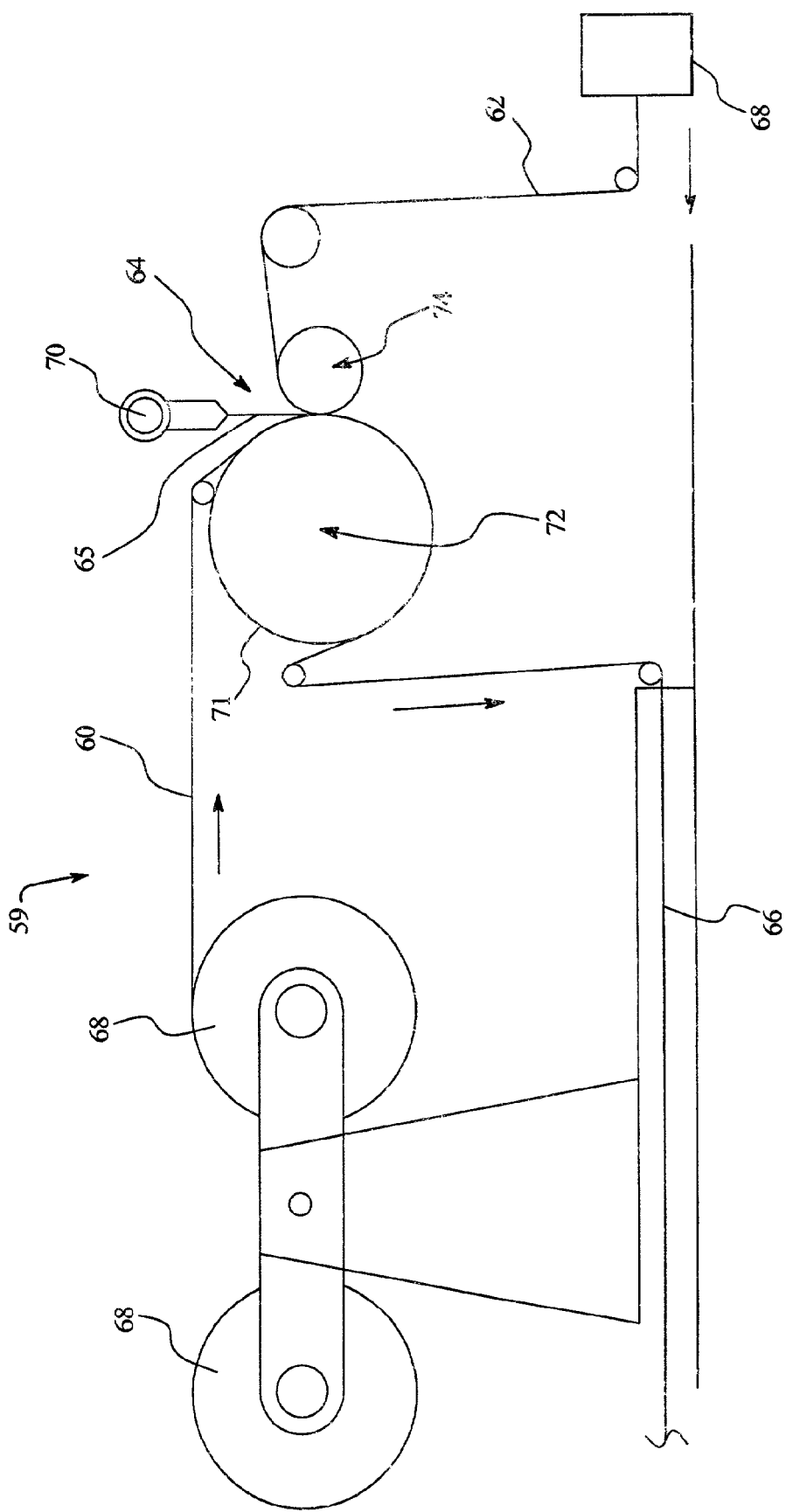
FIG. 6 is a schematic view of a process for texturing a surface of a film.

FIG. 6 shows a texturing station 59 where a preferred method for imparting the pattern on the films. The method comprises the steps of: (1) providing a first sheet of material 60, (2) providing a second sheet of material 62, (3) positioning the first sheet 60 or the second sheet 62 to overlap at least a portion of the other sheet to define an interference zone 64, (4) directing a first polymeric material 65 into the interference zone 64 to adhere the first sheet 60 to the second sheet 62 to form a layered structure 66 (FIG. 7), and (5) texturing a surface of the first sheet or the second sheet to form a pattern on the surface.

In a preferred form of the invention the first sheet and the second sheet are polymeric films as described above. However, it is contemplated that the first sheet and/or the second sheet could be selected from paper or metal foil provided that one of the layers is capable of maintaining the pattern during regular use of the layered structure 66.

The first sheet 60 can be a monolayer structure or a multiple layered structure as set forth above. The monolayer structure can be of a polymer blend of the polymeric components. The multiple layered structure can have a layer or more than one layer of a polymer blend of the polymeric components. In one preferred form of the invention the first sheet is a film having a layer of a polyolefin and more preferably an ethylene and α-olefin copolymer, and even more preferably is an LLDPE. Such a first sheet having an LLDPE layer has been found to be well suited to form a seal layer or liquid contacting layer of a container 10 as LLDPE forms strong, durable seals.

In another preferred form of the invention, the first sheet 60 can also be a multiple layered polymeric structure having a first layer of a polyolefin and a second layer to provide additional attributes to the film such as scratch resistance, barrier to the transmission of gasses or water vapor or the like. Suitable materials to form a barrier material includes ethylene and vinyl alcohol copolymers, polyamides, polyesters, PVDC and metal foil to name a few. One preferred multiple layered film to form the first sheet 60 has a first layer of LLDPE and a second layer of ethylene vinyl alcohol copolymer.

The second sheet 62 is also preferably a monolayer polymeric film or a multiple layered polymeric film selected from the films and polymeric materials detailed above. In one preferred form of the invention, the second sheet 62 is a barrier material and more preferably a polyamide or polyester and even more preferably nylon 6. The first sheet 60 and the second sheet 62 can be preformed and provided on spooled rolls 68 or the sheets can be laminated or otherwise produced in line.

The step of positioning the first sheet 60 in an overlapping relationship with the second sheet 62 is accomplished using standard polymeric sheet handling machinery. In a preferred form of the invention either the first sheet 60 is positioned with respect to the second sheet 62, or the second sheet 62 is positioned with respect to the first sheet 60 or both sheets are positioned with respect to one another so that in any instance the peripheries of the first and second sheet are essentially in complete registration.

The step of directing the first polymeric material 65 into the interference zone 64 to adhere the first sheet 60 to the second sheet 62 to form the layered structure 66 can be carried out by flowing polymeric material in a molten form into the interference zone 64. Molten polymeric material can be provided under pressure to the interference zone 64 using an extrusion die 70. The polymeric material may be extruded as a single polymeric material or a blend of polymeric materials. The polymeric material may also have multiple layers coextruded from a coextrusion die. It is also contemplated to that the first polymeric material can be an adhesive that can be sprayed or otherwise spread or distributed into the interference zone 64. In a preferred form of the invention the first polymeric material is a polyolefin and more preferably an ethylene homopolymer and even more preferably a LDPE.

The step of texturing the film can include the step of imparting a desired pattern described above onto the first sheet 60 or the second sheet 62 or both. The step can be carried out prior to the step of joining the sheets together, substantially or essentially simultaneously with the step of adhering the first and second sheets together, as shown in FIG. 6, or after the step of adhering the first sheet to the second sheet. In a preferred form of the invention the step of texturing is carried out substantially simultaneously with the joining step.

The step of texturing the film includes the step of bringing the sheet or layered structure to be textured into cooperative engagement with a surface having the desired pattern thereon. In a preferred form of the invention, the surface 71 is located on a roll and more preferably a chill roll 72. The chill roll 72 can be fabricated from any suitable material such as metal, plastic or cork. The chill roll 72 can have the pattern extending inward of its outer surface or can extend outward from its outer surface. The sheet or structure is held in cooperative engagement against the chill roll 72 using a back-up roll 74. The back-up roll 74 can be made from metal, rubber, plastic or paper and most preferably rubber. It should be understood that either the chill roll 72, the back-up roll 74 or both can carry the pattern.

After the layered structure 66 passes the chill roll it proceeds along to a spooling station or to be fabricated into useful objects like the container 10.

FIG. 7 shows the layered structure 66 having the first sheet 60 joined to the second sheet 62 by polymeric material 65. Objects 20 are shown on the first sheet 60 but could be positioned on sheet 62 or both sheets 60 and 62 without departing from the present invention.

While the specific embodiments have been described, numerous modifications come to mind without significantly departing from the spirit of the invention and the scope of protection is only limited by the scope of the accompanying claims. This design is just one example of a pattern design having these favorable characteristics, and disclosure of it is merely one example of a design having its favorable characteristics, others of which are not significant departures from the spirit of the invention.

We claim:

1. A method for forming a fluid container comprising:
providing a first non-molten polymeric sheet of material;

providing a second non-molten polymeric sheet of material;

positioning the first non-molten sheet or the second non-molten sheet to overlap at least a portion of the other sheet to define an interference zone;

directing a first molten polymeric material into the interference zone to adhere the first non-molten sheet to the second non-molten sheet to form the layered structure;

texturing a surface of the first non-molten sheet or the second non-molten sheet utilizing a chill roll to form a pattern on the surface, the pattern being dimensioned to form fluid pathways on the surface to assist in removing fluid from the surface;

forming a container having opposed sidewalls from the layered structure, the opposed sidewalls having fluid contacting surfaces facing a chamber of the container and having the fluid pathways positioned on the fluid contacting surfaces of each of the opposed sidewalls, and providing an access member fixedly attached to one of the sidewalls for providing fluid access to the chamber.

2. The method of claim 1 wherein the first non-molten polymeric sheet is a monolayer structure.

3. The method of claim 1 wherein the first non-molten polymeric sheet is a multiple layer structure.

4. The method of claim 1 wherein the first non-molten polymeric sheet is selected from the group consisting of polyolefins, ethylene and vinyl acetate copolymers, ethylene copolymerized with carboxylic acids having from 3 to 20 carbons and ester and anhydride derivatives thereof, ethylene and vinyl alcohol copolymers, polyamides, polyesters, polyvinyl vinyl chloride, PVDC and elastomers.

5. The method of claim 4 wherein the polyolefins are selected from homopolymers and copolymers.

6. The method of claim 5 wherein the copolymers are selected from copolymers of ethylene and α-olefins having from 3 to 20 carbons.

7. The method of claim 3 wherein the multiple layered structure comprises a first layer of an ethylene and α-olefin copolymer and a second layer of an ethylene and vinyl alcohol copolymer.

8. The method of claim 4 wherein the second non-molten polymeric sheet is selected from the group consisting of polyolefins, ethylene and vinyl acetate copolymers, ethylene copolymerized with carboxylic acids having from 3 to 20 carbons and ester and anhydride derivatives thereof, ethylene and vinyl alcohol copolymers, polyamides, polyesters, polyvinyl vinyl chloride and elastomers.

9. The method of claim 8 wherein the second non-molten polymeric sheet is a polyamide.

10. The method of claim 9 wherein the polyamide is selected from nylon 6,6, nylon 6, and nylon 6,12.

11. The method of claim 1 wherein the step of directing a first polymeric material comprises the step of extruding a molten polymeric material.

12. The method of claim 11 wherein the molten polymeric material is a polyolefin.

13. The method of claim 11 wherein the molten polymeric material is a homopolymer of ethylene.

14. The method of claim 1 wherein the step of texturing comprises the step of contacting the first sheet or the second sheet with a surface having a pattern.

15. The method of claim 14 wherein the surface is provided on a roll.

16. The method of claim 15 wherein the surface is provided on the chill roll.

17. The method of claim 15 wherein the surface is provided on a backup roll.

18. The method of claim 14 wherein the pattern is carried on two rolls.

19. The method of claim 15 wherein the pattern extends outward from the surface of the roll.

20. The method of claim 15 wherein the pattern extends inward from the surface of the roll.

21. The method of claim 15 wherein the chill roll is metal.

22. The method of claim 15 further comprising a backup roll of metal, rubber, plastic, or rubber.

23. The method of claim 15 wherein the pattern comprises a plurality of spaced objects.

24. A method for forming a fluid container comprising:

providing a first non-molten sheet of a first polymeric material selected from the group consisting of polyolefins, ethylene and vinyl acetate copolymers, ethylene copolymerized with carboxylic acids having from 3 to 20 carbons and ester and anhydride derivatives thereof, ethylene and vinyl alcohol copolymers, polyamides, polyesters, polyvinyl vinyl chloride and elastomers;

providing a second non-molten sheet of a second polymeric material;

positioning the first non-molten sheet or the second non-molten sheet to overlap at least a portion of the other sheet to define an interference zone;

directing a molten third polymeric material into the interference zone to adhere the first non-molten sheet to the second non-molten sheet to form the layered structure;

texturing the first non-molten sheet to form a pattern on a surface of the first non-molten sheet utilizing a chill roll, the pattern being dimensioned to form fluid pathways on the surface to assist in removing fluid from the surface;

forming a container having a chamber defined by opposed sidewalls having one of the opposed sidewalls formed from the layered structure and having the fluid pathways positioned facing the chamber; and providing an access member fixedly attached to a planar surface of one of the sidewalls for providing fluid access to the chamber.

25. The method of claim 24 wherein the second polymeric material is selected from the group consisting of polyolefins, ethylene and vinyl acetate copolymers, ethylene copolymerized with carboxylic acids having from 3 to 20 carbons and ester and anhydride derivatives thereof, ethylene and vinyl alcohol copolymers, polyamides, polyesters, polyvinyl vinyl chloride, PVDC and elastomers.

26. The method of claim 25 wherein the step of texturing is carried out essentially simultaneously with the step of adhering the first sheet to the second sheet.

27. The method of claim 24 wherein the step of directing a third polymeric material into the interference zone comprises the step of applying an adhesive material.

28. The method of claim 26 wherein the step of texturing comprises the step of contacting the first non-molten sheet with a surface having a pattern.

29. The method of claim 28 wherein the surface is provided on a roll.

30. The method of claim 29 wherein the surface is provided on the chill roll.

31. The method of claim 29 wherein the surface is provided on a back-up rail.

32. The method of claim 28 wherein the surface is carried on a second roll.

33. The method of claim 29 wherein the pattern extends outward from the surface of the roll.

34. The method of claim 29 wherein the pattern extends inward from the surface of the roll.

35. The method of claim 28 wherein the pattern is generally a checkerboard pattern.

36. The method of claim 28 wherein the pattern is defined by a series of spaced protuberances.

37. The method of claim 36 wherein the protuberances have a generally circular shape.

38. The method of claim 36 wherein the protuberances have a polygonal shape.

39. The method of claim 36 wherein the protuberances have an irregular shape.

40. The method of claim 36 wherein the protuberances have a generally teardrop shape.

41. The method of claim 36 wherein the protuberances have a first set of protuberances with a first shape and a second set of protuberances with a second shape different from the first shape.

42. The method of claim 36 wherein the protuberances are generally S-shaped.

43. The method of claim 26 wherein the first non-molten sheet is a monolayer structure or a multiple layered structure.

44. The method of claim 26 wherein the first non-molten sheet is a monolayer structure.

45. The method of claim 26 wherein the first non-molten sheet is a multiple layered structure.

46. The method of claim 45 wherein the multiple layered structure has a first layer and a second layer.

47. The method of claim 46 wherein the first layer is a polyolefin.

48. The method of claim 47 wherein the second layer is a barrier material.

49. The method of claim 48 wherein the barrier material comprises ethylene vinyl alcohol copolymer or PVDC.

50. The method of claim 46 wherein the first layer is an ethylene and α-olefin copolymer and the second layer is ethylene and vinyl alcohol copolymer.

51. The method of claim 43 wherein the second non-molten sheet is a monolayer structure or a multiple layered structure.

52. The method of claim 51 wherein the second non-molten sheet contains a layer of a polyamide or a layer of a polyester.

53. The method of claim 52 wherein the third polymeric material is a polyolefin.

54. The method of claim 53 wherein the third polymeric material is a homopolymer of ethylene or a copolymer of ethylene and α-olefin having from 3 to 20 carbons.

55. The method of claim 54 wherein the third polymeric material is a homopolymer of polyethylene.

56. A method forming a container comprising:
providing a multiple layer film fanned in an extrusion lamination process wherein a first non-molten polymeric sheet of material is attached to a second non-molten polymeric sheet of material by directing a first molten polymeric material between the first non-molten sheet of material and the second non-molten sheet of material to form a layered structure and while attaching the first non-molten sheet of material to the second non-molten sheet of material texturing a surface of the first non-molten sheet or the second non-molten sheet utilizing a chill roll to form a pattern on the surface, the pattern being dimensioned to form fluid pathways on the surface to assist in removing fluid from the surface; and
forming a container having opposed sidewalls sealed along peripheral edges to define a fluid tight chamber, and at least one sidewall formed from the multiple layer film, the at least one sidewall having a fluid contacting surface facing the chamber of the container and having the fluid pathways positioned on the fluid contacting surface, the container further having an access member fixedly attached to one of the opposed sidewalls for withdrawing fluid from the fluid tight chamber.

57. The method of claim 56 wherein the access member is a fitment for filling and withdrawing fluid from the chamber.

58. The method of claim 57 wherein the fitment is adapted to be connected to a hose.

59. The method of claim 56 wherein the each of the opposed sidewalls are formed from the multiple layer film and each have fluid contacting surfaces facing the chamber and each of the fluid contacting surfaces have the fluid pathways positioned thereon.

* * * * *